United States Patent [19]

Wojcik

[11] Patent Number: 5,301,726
[45] Date of Patent: Apr. 12, 1994

[54] WORKPIECE STABILIZER FOR BENCH TOOLS

[76] Inventor: Joseph J. Wojcik, 30 Avery St., Lowell, Mass. 01851

[21] Appl. No.: 967,701

[22] Filed: Oct. 28, 1992

[51] Int. Cl.⁵ .......................... B27C 5/02; B27C 1/14
[52] U.S. Cl. .................... 144/253 J; 83/452; 83/460; 83/467.1; 144/242 B; 144/253 R; 144/253 F; 269/303
[58] Field of Search ................. 269/303; 83/451, 452, 83/460, 467.1; 144/253 R, 253 F, 253 H, 253 J, 251 R, 251 A, 134 A, 242 B

[56] References Cited

U.S. PATENT DOCUMENTS

| | | |
|---|---|---|
| 552,610 | 1/1896 | Ingstrum. |
| 1,394,499 | 10/1921 | Fisher. |
| 2,525,894 | 10/1950 | Graham ............................ 144/253 F |
| 2,612,914 | 10/1952 | Reynolds ......................... 144/253 F |
| 2,895,517 | 7/1959 | Rhett. |
| 4,499,933 | 2/1985 | Thompson ........................ 144/253 J |

FOREIGN PATENT DOCUMENTS 374207 6/1932 United Kingdom ............. 144/253.5

Primary Examiner—W. Donald Bray
Attorney, Agent, or Firm—Pearson & Pearson

[57] ABSTRACT

Stabilizing apparatus for controlling the position of a workpiece relative to a tool. The stabilizing apparatus includes an elongated base for attachment to the tool, an elongated adjustable support that is essentially parallel to the base, and an interconnecting structure that enables the adjustable support to move relative to the base. When a workpiece moves toward the tool, it displaces the adjustable support toward the base thereby compressing springs in the interconnecting structure. This produces a clamping force against an opposed work support surface that stabilizes the position of the workpiece transversely to the direction of travel but allows movement along the work path. Multiple stabilizing apparatus can be used to provide both vertical and horizontal clamping forces.

28 Claims, 8 Drawing Sheets

WORKPIECE STABILIZER FOR BENCH TOOLS

BACKGROUND OF THE INVENTION

1. Field of the Invention

This invention relates generally to power woodworking, machine and other bench tools for cutting, shaping and drilling a workpiece and more specifically to apparatus for stabilizing the workpiece during its displacement relative to the tool.

2. Description of Related Art

Power woodworking and machine tools to which this invention pertains include table saws, radial arm saws, shapers, router tables, drill presses and the like. These tools, hereinafter call "bench tools," comprise certain basic components. Each has a "work surface" that supports the workpiece. Tables associated with each of the specified bench tools and others typically provide such a work surface. Bench tools also include a cutting mechanism, or cutting tool, such as a saw blade, drill bit, router bit or the like, and an arbor or chuck for attaching the cutting tool to an electric motor.

A typical table provides a horizontal work surface that supports the workpiece during its relative displacement with respect to the cutting tool. On some bench tools, the operator moves the workpiece across the work surface into contact with a cutting tool that is at a fixed position on the table. For example, a table saw comprises a motorized circular saw supported below a horizontal work surface. The top portion of the saw blade extends above the work surface into the tool work plane where cutting takes place. The operator slides a workpiece along the work surface past the rotating blade thereby to cut the workpiece. On other bench tools, the workpiece is stationary on the work surface while the cutting tool is moved into contact with the workpiece. For example, in a drill press a vertically oriented drill displaces along a vertical axis into a workpiece held in one position on the work surface. A radial arm saw is another example of such a bench tool.

Some bench tools, such as table saws, router tables and shapers, often include a vertical fence that mounts to the table adjacent to the cutting tool. Prior art fences generally comprise one or more square or rectangular plates mounted on the bench work surface perpendicular to the work surface. As an operator moves the workpiece past the cutting tool, the fence engages a vertical workpiece surface to stabilize the horizontal position of the workpiece relative to the cutting unit. The fence thus establishes a "second work surface" that is substantially perpendicular to the plane of the horizontal work surface that the table defines.

In order to move a workpiece in a straight line, an operator must exert a force on the workpiece that has three orthogonally directed components. A first or vertical component is perpendicular to the work surface to maintain firm contact between the workpiece and the horizontal work surface. A second or horizontal component is parallel to the work surface and normal to the fence to maintain the workpiece against the fence. The third is another horizontal component parallel to the fence to displace the workpiece past the cutting tool. On a table saw, for example, the operator must continuously hold the workpiece horizontally against the fence and vertically on the work surface while simultaneously feeding the workpiece toward and past the cutting saw blade.

It is often difficult to maintain such orthogonal forces uniformly against the workpiece as it moves. This is particularly true with woodworking tools because the wood is not uniform, so the resistance to pressure produced as the workpiece engages the cutting tool can vary greatly and unexpectedly. It can also be particularly difficult to simultaneously push a long workpiece toward the cutting blade while holding the workpiece firmly against the fence, since the operator must initially push the back end of the workpiece, which may be a substantial distance from the tool and fence, toward the cutting tool. If the workpiece moves relative to the fence, an uneven cut results. If the workpiece moves relative to the horizontal work surface, the cutting tool can drive the workpiece back toward the operator. Finally, it becomes difficult and dangerous to maintain all these force components as the end of a workpiece passes the cutting tool because the operator's fingers often are proximate the cutting tool.

U.S. Pat. No. 552,610 to Fisher discloses a protective hood that extends over a cutting blade on a jointer or shaper to prevent an operator's hands from contacting the cutting blade. The hood moves vertically relative to a fence according to the size of wood being cut. The hood also reciprocates horizontally with respect to the fence to cover the cutting blade during use.

U.S. Pat. No. 2,895,517 to Rhett discloses a protective guard for a jointer that closes behind the back end of a workpiece and toward a fence to prevent an operator's fingers from contacting the cutting blade. The guard is spring-projected toward the fence and comprises a leading member with a cam edge and a trailing frame member that supports a plurality of posts, each of which is independently spring-projected toward the fence. As the leading end of a workpiece engages the cam edge of the leading member, the guard moves from the fence to allow for continued feeding of the workpiece. As the trailing end passes the leading member, a spring drives the leading member back to the fence before the operator's fingers can reach the cutting tool. Simultaneously, the posts move into abutting engagement with the workpiece thereby to cover the cutterhead while the workpiece passes over the cutterhead. As the trailing end of the workpiece moves past the cutterhead, the posts are driven sequentially toward the fence U.S. Pat. No. 1,394,499 to Ingstrum discloses a protective guard for a jointer that comprises an elongated extendable body with a pivoted, spring-biased toggle arm at one end. The guard covers a rotating hub whenever a table is not being used. As a workpiece advances along a fence toward the cutterhead, it engages a cam head and pivots the toggle arm toward the fence to move the protective guard away from the fence. This allows the workpiece to pass the elongated body. When the trailing end of the workpiece passes the toggle arm, the toggle arm pivots away from the fence, and the elongated body returns to its extended position against the fence.

The apparatus disclosed in each of the foregoing patents forces a workpiece against a fence as the workpiece passes a cutting tool. However, the apparatus applies such lateral pressure only at the point where the workpiece engages the cutting tool. The apparatus does not apply uniform pressure along the entire length of the workpiece or along any continuous substantial portion thereof. The operator's ability to push the workpiece in a straight path past the cutting tool in contact with a fence and work surface is still required. Moreover, the apparatus is adapted for use with a single type bench tool. Fisher discusses jointers or shapers; Rhett and Ingstrum only discuss jointers. The structures are not readily adapted for use with a wide variety of bench tools including, but not limited to, table saws, radial arm saws, router tables, shapers and drill presses.

SUMMARY

Therefore it is an object of this invention to provide stabilizer apparatus for controlling the relative displacement of a workpiece and a cutting tool on bench tools.

Another object of this invention is to provide stabilizer apparatus for controlling the position of workpiece on a work table by engaging the workpiece along a significant portion of the work table.

Still another object of this invention is to provide stabilizer apparatus for use with a fence that establishes a second surface perpendicular to another work surface for controlling the position of the workpiece.

Yet another object of this invention is to provide a stabilizer apparatus adapted for use with a wide variety of bench tools.

Stabilizing apparatus in accordance with this invention includes an elongated base that attaches to one of two perpendicular work surfaces. An adjustable support defines a workpiece support plane that parallels the other of the two work surfaces. An interconnecting structure permits relative motion between the base member and the adjustable support whereby the adjustable support stabilizes the position of the workpiece against the other of the two work surfaces.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
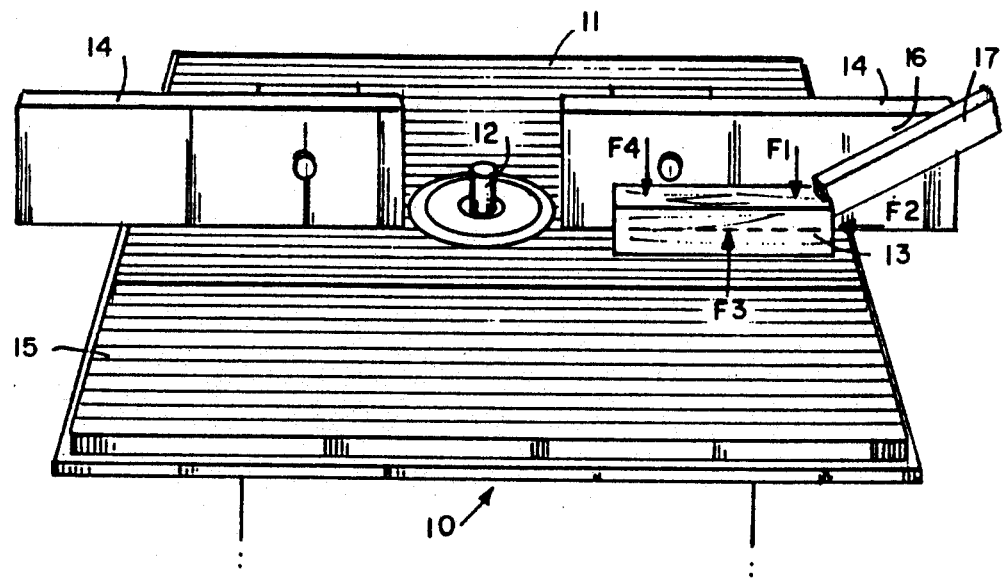
FIG. 1 is a diagrammatic view of a prior art bench tool to which this invention can be applied.

In accordance with this invention, an adjustable stabilizer controls the position of a workpiece, either horizontally or vertically, relative to the cutting unit on a bench tool. FIG. 1 depicts a prior art bench tool in the form of a router tool 10 that comprises a horizontal table 11 that supports a cutting tool 12, such as a router bit, and a workpiece 13. A drive motor (not shown) normally is supported below the table 11. A two-piece fence 14 having fence sections 14A and 14B mounts on the table 11 adjacent the cutting tool 12. Consequently the table 11 defines a first horizontal work surface 15 for supporting the workpiece 13 while the fence 14 including sections 14A and 14B disposed on opposite sides of the cutting tool 12 provides a second, vertical work surface 16 that is perpendicular to the work surface 15.

When it is necessary to move the workpiece 13 past the cutting tool 12, it is necessary to produce a series of forces that hold the workpiece 13 against the horizontal work surface 15, that hold the workpiece 13 against the vertical work surface 16 and that advance the workpiece 13 along the work surfaces 15 and 16 past the cutting tool 12. In machine tools such as shapers and table saws, jointers and the like, these forces are often produced with the operator's hands in combination with some accessory device such as a push stick 17.

Specifically the operator moves the workpiece by exerting a series of forces. If a push stick 17 is being used, the push stick will transfer forces from the operator's hand to a vertical force component F1 that holds one end of the workpiece 13 against the work surface 15 and a forward directed force component F2 that slides the workpiece 13 past the cutting tool 12. It is also necessary to produce a force component F3 that holds the workpiece 13 firmly against the vertical work surface 16 and a fourth force component F4 that holds the other end of the workpiece 13 firmly against the work surface 15. An operator normally applies the forces F3 and F4 by holding his hand against the top and side surfaces of the workpiece 13 or by using a guide strip, finger board or other structure clamped to the table 11 or fence 14. Such guide strips, however, must be adjusted exactly in order to provide a sufficient clamping force on the workpiece to prevent unintentional motion of the workpiece 13 as it passes the cutting tool 12 without introducing frictional forces that prevent the motion of the workpiece 13 past the cutting tool 12.

In FIG. 1 it is necessary that the force components F1, F3 and F4 are sufficiently great to maintain contact continuously between the workpiece 13 and the work surfaces 15 and 16. However, those force components can be not so strong as to introduce friction between the workpiece 13 and the work surfaces 15 and 16 as to inhibit the ready displacement of the workpiece 13 along the work surfaces 15 and 16 in the direction of force F2.

Figure 2:
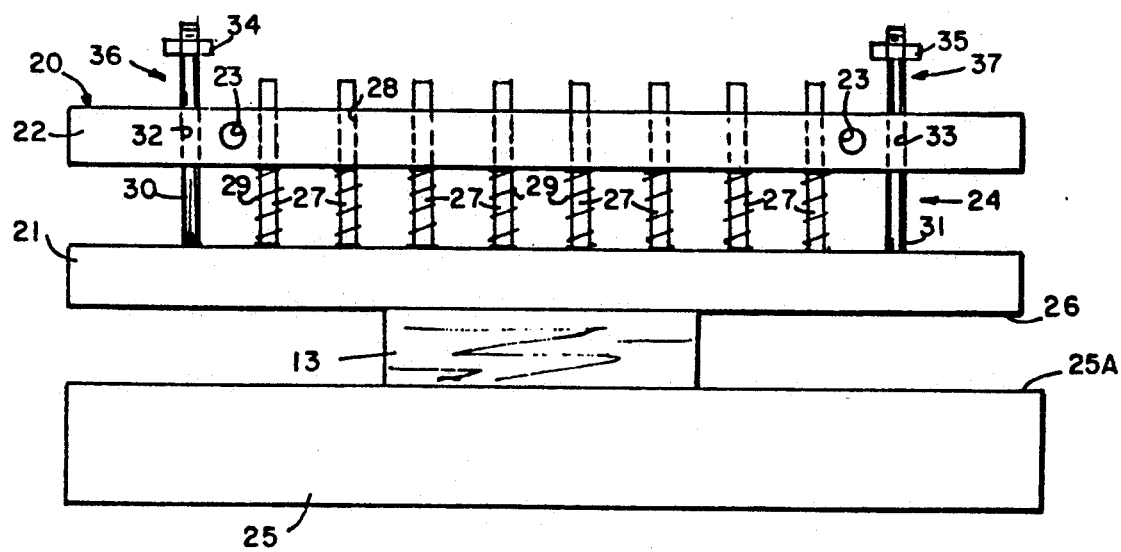
FIG. 2 is a plan view of one embodiment of a stabilizer embodying various features of this invention.

FIG. 2 depicts one embodiment of a stabilizing apparatus 20 constructed in accordance with this invention that can stabilize a workpiece against a work surface as the workpiece passes a cutting tool. As shown in FIG. 2, the stabilizing apparatus 20 comprises two elongated parallel members that define an adjustable support 21 and an elongated base 22. Apertures 23 represent structures for clamping the elongated base 22 to a supporting structure such as the work table 11 or fence 14 in FIG. 1. Such clamping structures may merely comprise C-clamps that attach to the base 22 and a fence. A spring loaded connecting structure 24 carries the elongated adjustable support 21 for motion relative to the elongated base 22 and another work surface, shown as the top surface 25A of a member 25. The elongated adjustable support 21 thus provides a planar work support surface 26 that is adjustably displaceable from the work surface 25A.

Still referring to FIG. 2, the connecting structure 24 comprises a series of parallel posts 27 that attach to the adjustable support 21. These posts may, in some embodiments, be in line or, in other embodiments, be staggered to form spaced parallel rows of posts 27. In either form, each post 27 extends into an aperture 28 in the elongated base 20. Each post 27 also supports a concentric compression spring 29 or similar compression device that engages the counterfacing surfaces of the adjustable support 21 and the elongated base 22.

End posts 30 and 31 at opposite ends of the stabilizing apparatus 20 limit the displacement of the adjustable support 21 from the elongated base 22. Each of the end posts 30 and 31 attaches to the adjustable support 21 and extends through aligned apertures 32 and 33 in the elongated base 22. In a simple form, nuts 34 and 35 attach to threaded ends of the posts 30 and 31 thereby to provide variable displacement limit structures 36 and 37.

Still referring to FIG. 2, the elongated base 22 can be readily clamped to the fence 14 or the work table 11 of FIG. 1. Normally it will be displaced that such the work surface 26 is spaced from the work surface 25A by a distance that is slightly less than the expected thickness of a workpiece or group of workpieces 13. As a workpiece 13 slides between the adjustable support member 21 and the work element 25 along the work surface 25A, the workpiece displaces the adjustable support 21 toward the elongated base 22 and compresses all the springs 29. If the apertures 28 are slightly larger than the post 27, then the adjustable support plate 21 can assume a non-parallel relationship as a workpiece is introduced at one end of the adjustable support 21. When a substantial portion of the workpiece 13 lies between the surfaces 25A and 26, the net forces on all the springs realign the adjustable support 21 into a parallel relationship with both the elongated base 22 and the work surface 25A. This produces force components that are analogous to force components F1 and F4 in FIG. 1. Consequently the adjustable support 21 will exert a force normal to the work surface 25A that is essentially constant as the workpiece 13 travels along the work surface 25A.

Figure 3B:
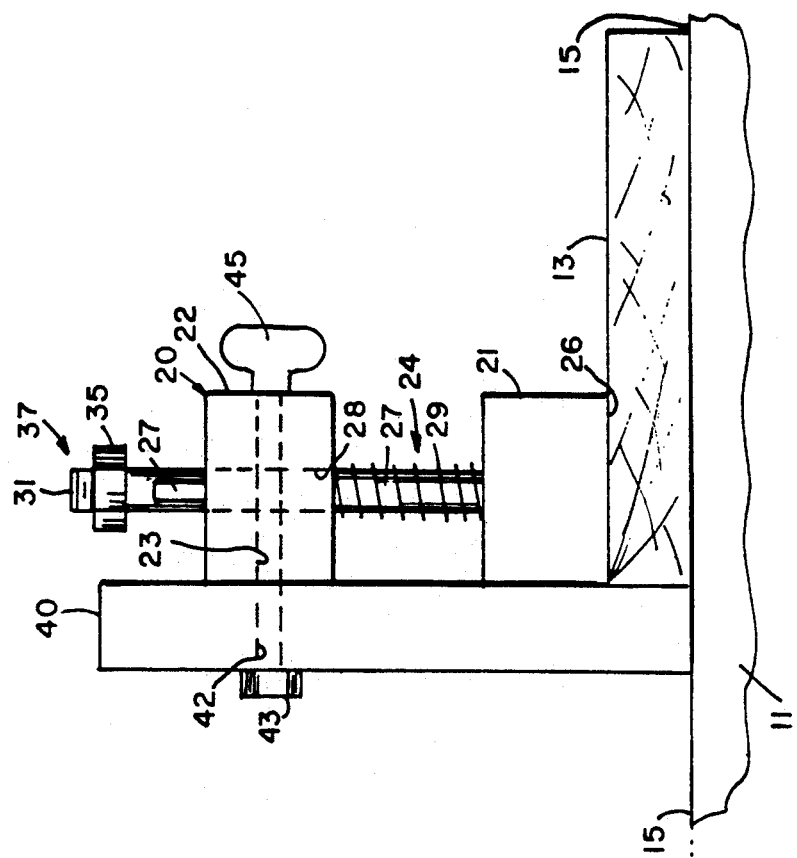
FIGS. 3A and 3B are detailed views of the structure shown in FIG. 2.
Figure 3A:
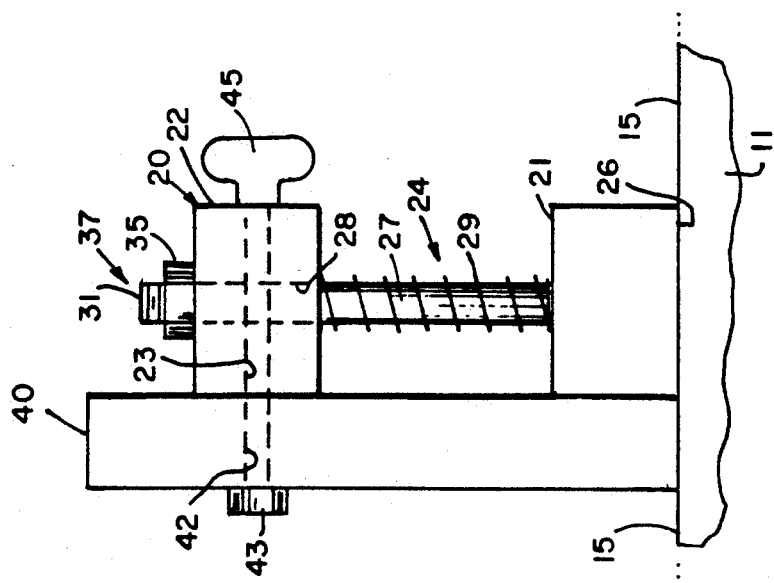

FIG. 3A depicts an end view of a structure shown in FIG. 2 adapted for connection to a fence 40 that attaches to a horizontal table 11. In accordance with another aspect of this invention, the fence 40 includes an aperture 42 for receiving an integral clamping mechanism associated with the stabilizing apparatus 20. Specifically a bolt 43 has a head 43 that abuts the fence 40 and a body section that extends through the aperture 42 and the aperture 23 in the elongated base 22. A wing nut 45 or similar device can engage the end of the machine screw 43 to complete the structure.

In FIG. 3A the elongated base 22 locates the adjustable support 21 at the work surface 15 when the interconnecting structure is in its extended configuration. As a work piece 13 begins to pass below the adjustable support 21, the adjustable support 21 rises as shown in FIG. 3B. Consequently the posts 27 and the posts 35 displace vertically upward with respect to the base 22. This compresses the springs 29 so the adjustable support 21 applies a stabilizing force to the workpiece 13 that holds the workpiece 13 against the horizontal work surface 15.

Figure 4B:
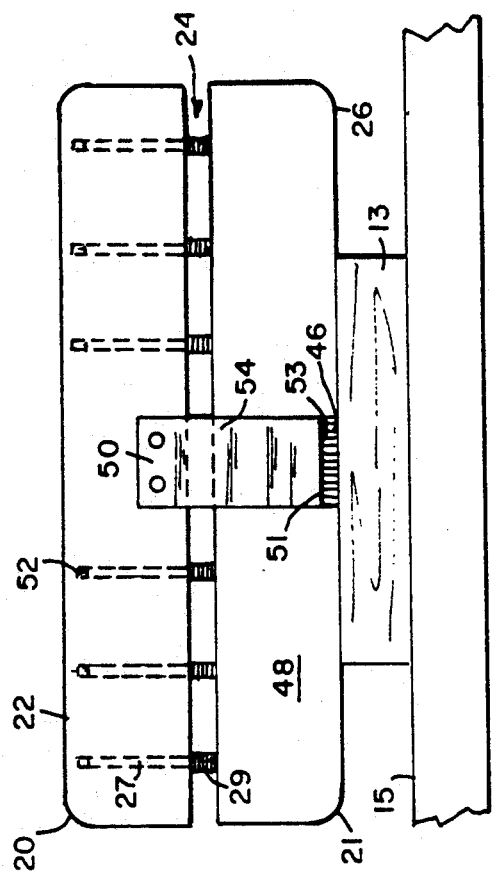
FIG. 4A and 4B are a front view of an alternate stabilizer embodiment.
Figure 4A:
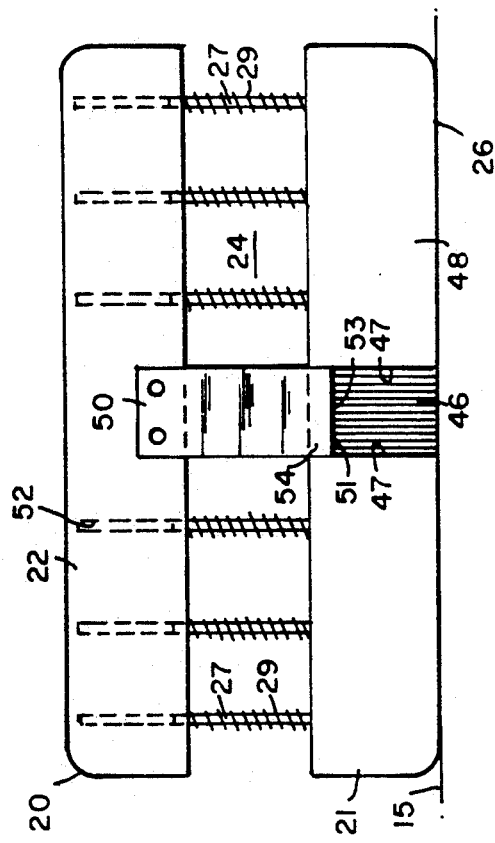

If the stabilizing apparatus 20 shown in FIGS. 2, 3A and 3B is applied to a fence that extends continuously along the table, as with a table saw fence, the apparatus 20 will have a corresponding length so it is substantially coextensive with the entire length of the fence. If however, the fence has a configuration like the fence 14 shown in FIG. 1, the actual configuration could include first and second stabilizing structures 20A and 20B as shown in FIG. 4 attached individually to each of the fence sections 14A and 14B on opposite sides of the table. Each includes the basic components, namely: an elongated base 22, an adjustable support 21 and a connecting structure 24. In this manner each stabilizing apparatus 20A and 20B acts on the workpiece 13 over the entire length of the work surface 15, even though the fence comprises separated sections 14A and 14B.

FIG. 4 depicts a modification of the stabilizing apparatus structure that can be used if the apertures 28 are slightly oversized with respect to the posts 27. In such a situation, it is possible for the adjustable support 21 to twist out of a plane through the elongated base 22. If it is important to maintain that in-plane relationship, each stabilizing apparatus 20A and 20B will include a channel 46, shown as a vertical channel in FIG. 4, formed in one surface of the adjustable support 21. The channel 46 includes edges 47 and a back surface 48. A recessed tab 50 attaches to the elongated base 22 and a remote end 51 nests in the channel 46. Consequently the tab 50 engages the edges 47 and back surface 48 of the channel 46 during motion of the adjustable stabilizer relative to the elongated base 22. This engagement prevents the adjustable support 21 from twisting out of the plane of the elongated base 22.

As the workpiece 13 moves to the left in FIG. 4, it will engage and lift the adjustable support 21 associated with stabilizing apparatus 20A. Then both the apparatus 20A and 20B stabilize the workpiece 13 against the work surface 15. When the workpiece 13 passes the cutting tool (not shown), the adjustable support 21 associated with stabilizing apparatus 20B moves to the work surface 15 while the stabilizing apparatus 20A applies a stabilizing force to the workpiece 13. In use the position of the elongated base 22 will be selected so that the workpiece 13 readily displaces the adjustable support 21 thereby to prevent the adjustable support 21 from blocking motion of the workpiece.

Figure 5:
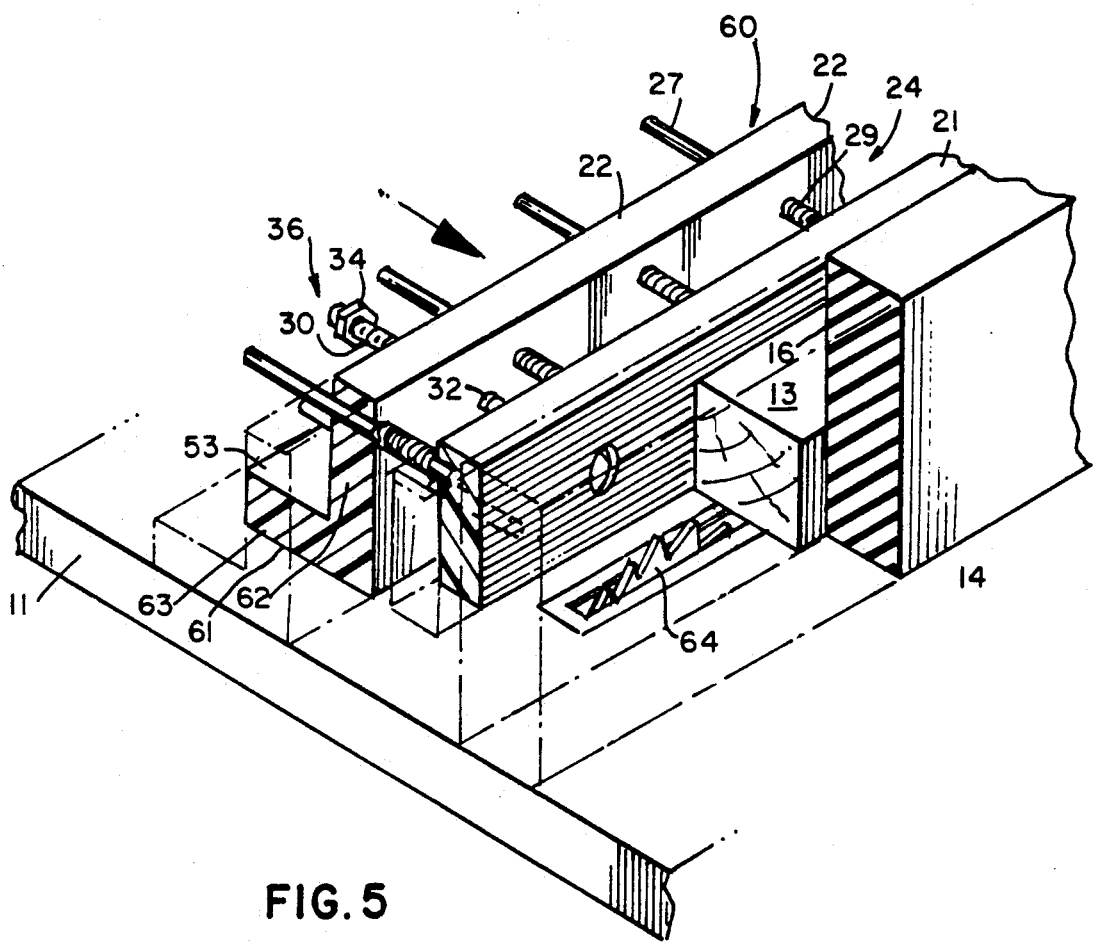
FIG. 5 is a detailed view of a stabilizer for controlling the position of a workpiece in the place of a work surface.

The stabilizing apparatus 60 shown in FIG. 5 is adapted to attach to a table 11 for clamping a work piece 13 against a fence 14 as shown in FIGS. 1 and 4 or a fence 40 as shown in FIGS. 3A and 3B. In the embodiment shown in FIG. 5 the stabilizing apparatus 60 includes an elongated base 22 in the form of an L-shaped member 61 with an upstanding leg 62 and a horizontal leg 63. The horizontal leg 63 clamps to the table 11 at some distances from the fence 14. The elongated base 22 carries the adjustable support 21 by means of posts 27. Springs 29 exert a force to displace the adjustable support 21 away form the elongated base 22 and toward the fence 14. A displacement limiting structure 36, including a post 30 and nut 34 at one end of the apparatus and another structure at the other end of the apparatus, confine the displacement.

When the base leg 63 is clamped to the table 11 and a workpiece 13 moves past a cutting tool such as a saw blade 64 extending above the table 11, the adjustable support 21 stabilizes the work piece 13 against the fence 14 by applying a horizontal force to the workpiece 13 that is analogous to the force component F3 in FIG. 1. Still referring to FIG. 5, this stabilizing force exists over the entire length of the fence 14. In some applications, particularly when ripping long pieces of wood, the extent of the apparatus 60 along the table 11 can be limited from the input edge of the table 11 to a point proximate the saw blade 64 so that any tendency of the adjustable support 21 to cant relative to the fence 14, particularly as the trailing edge of the workpiece approaches the saw blade, does not force the scrap leaving the saw blade to close the cut or kerf and produce saw binding.

Referring to FIGS. 3A, 3B and 5, if the base support 22 is clamped to the fence 14 or 40 or to the work table 11 to be substantially parallel to a corresponding work surface, the adjustable support 21 will, for reasonable skews of the base plate 22, still assume an orientation that parallels the work surface and applies a substantially even pressure to the workpiece 13 as it passes along the length of the adjustable support 21. This eliminates the need for precise positioning of guides as was required in the prior art.

Figure 6E:
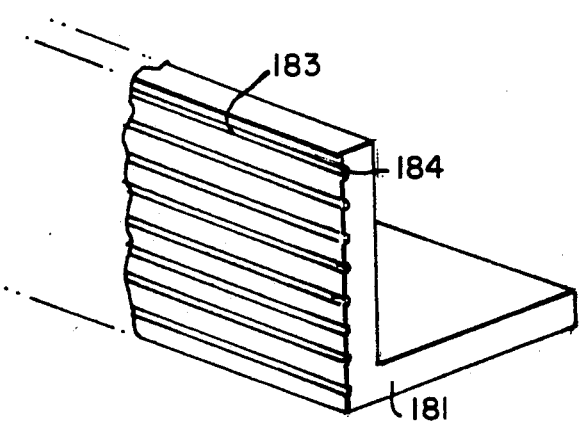
FIG. 6 is a perspective view of router table incorporating the stabilizing apparatus of this invention with FIGS. 6A, 6B, 6C, 6D and 6E depicting details of the stabilizing apparatus shown in FIG. 6.
Figure 6:
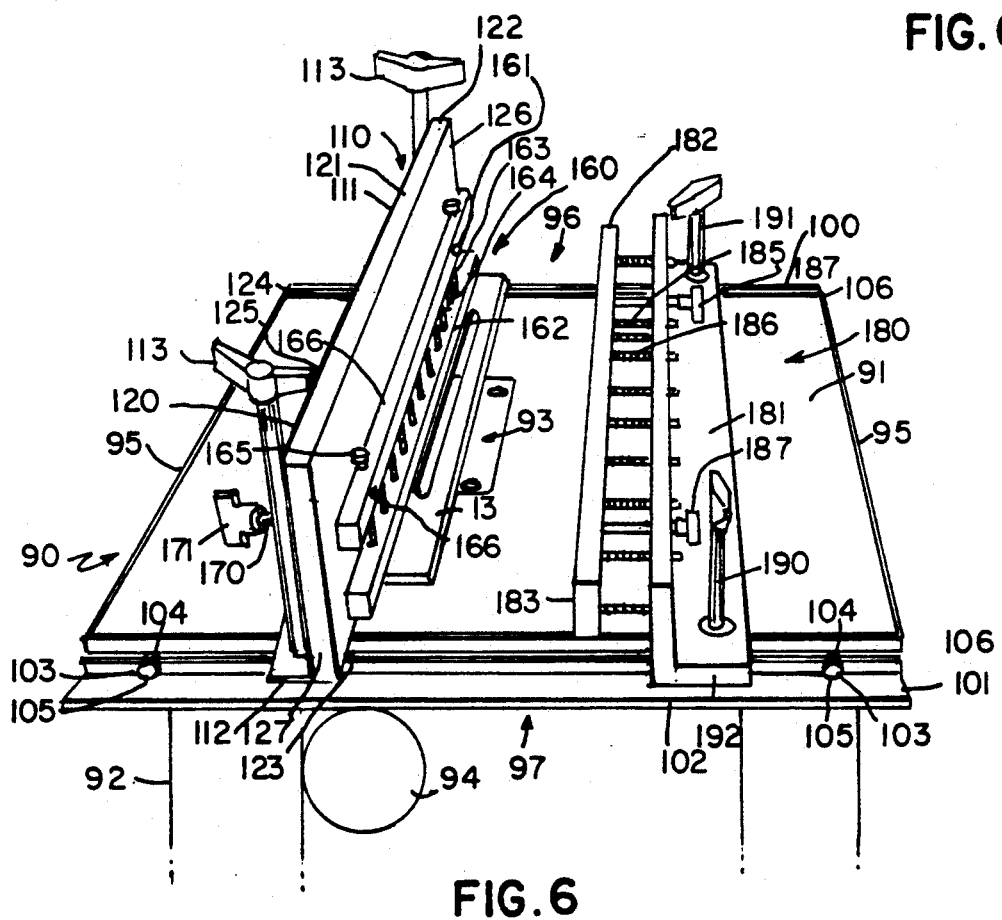

FIG. 6 depicts an embodiment of this invention that incorporates the basic structures of FIGS. 2 through 5 in a slightly modified form adapted for use with routing tables and the like. More specifically, FIG. 6 depicts a particular form of the stabilizing apparatus of this invention that utilizes two separate structures for stabilizing a workpiece on the routing table. As shown in FIG. 6, a router tool 90 comprises a table 91 and a stand 92. A cutter or bit position 93 is positioned on the table 91 above a motor 94 that the table 91 supports. The table may include edge structures, such as bands 95 and is characterized by having a input side 96 and an output side 97. In this particular tool 90, the bit position 93 is centrally located between the input side 96 and output side 97, but is offset from the center line between the other edges 95 of the table 91.

A slide 100 at the input side 96 and a slide 101 at the output side 97 include an aluminum or other metallic angle 102 fastened to a corresponding edge 95 by one or more bolts 103. Standoff bushings 104 space the vertical leg of the angle 102 from the corresponding edge 95 and nuts 105 capture the angle 101 against the edge 95 in a spaced relationship thereby to define a channel 106 across each of the input side 96 and the output side 97.

The channel 106 support a fence assembly 110 that is particularly useful in connection with this invention. The fence assembly 110 includes a vertical member 111 mounted to an aluminum angle base support 112. Clamps 113 at either end of the fence engage the channel 106 to allow the fence 110 to move from side to side relative to the cutter or bit position 93. As shown particularly in FIGS. 6 and 6A, each clamp 113 includes a handle 114 fixedly attached to one end of a threaded bolt 115. The other end of the threaded bolt engages a tee-nut 116 that slides in the channel 106 between the edge 95 and the angle 102. The threaded bolt 115 rides in an intermediate tube 117 with a bottom flange 118 that bears against a horizontal surface of the base support 112. Thus, the clamps 113 provide a convenient structure for aligning the fence assembly 110 relative to the cutter or bit position 93.

It is important that a fence such as the vertical fence 111 be positioned vertically with respect to the table 91 and that it define a straight plane. The fence 110 includes a first and a second vertical alignment structures at positions 120 and 121 on the side facing away from the bit position 93. Each structure connects between a top edge 122 of the fence 110 and a bottom edge 123 and provides vernier adjustment of the work surface defined by the fence 111 relative to the work surface defined by the table 91. Thus, the fence 111 is adjustable to a position that is exactly perpendicular to the table 91. This structure is more particularly shown by reference to FIG. 6B.

Horizontal alignment structure 124 and 125 intermediate the vertical alignment structures 120 and 121 to maintain the fence in straight planar configuration between an input edge 126 and an output edge 127 of the fence 110. These horizontal alignment structures 124 and 125 provide a vernier adjustment of the fence 111 so that its surface remains in a single plane along the table and that is parallel to a tool work plane extending through the cutter or bit position 93 from the input side 95 to the output side 96 of the table 91.

Figure 6A:
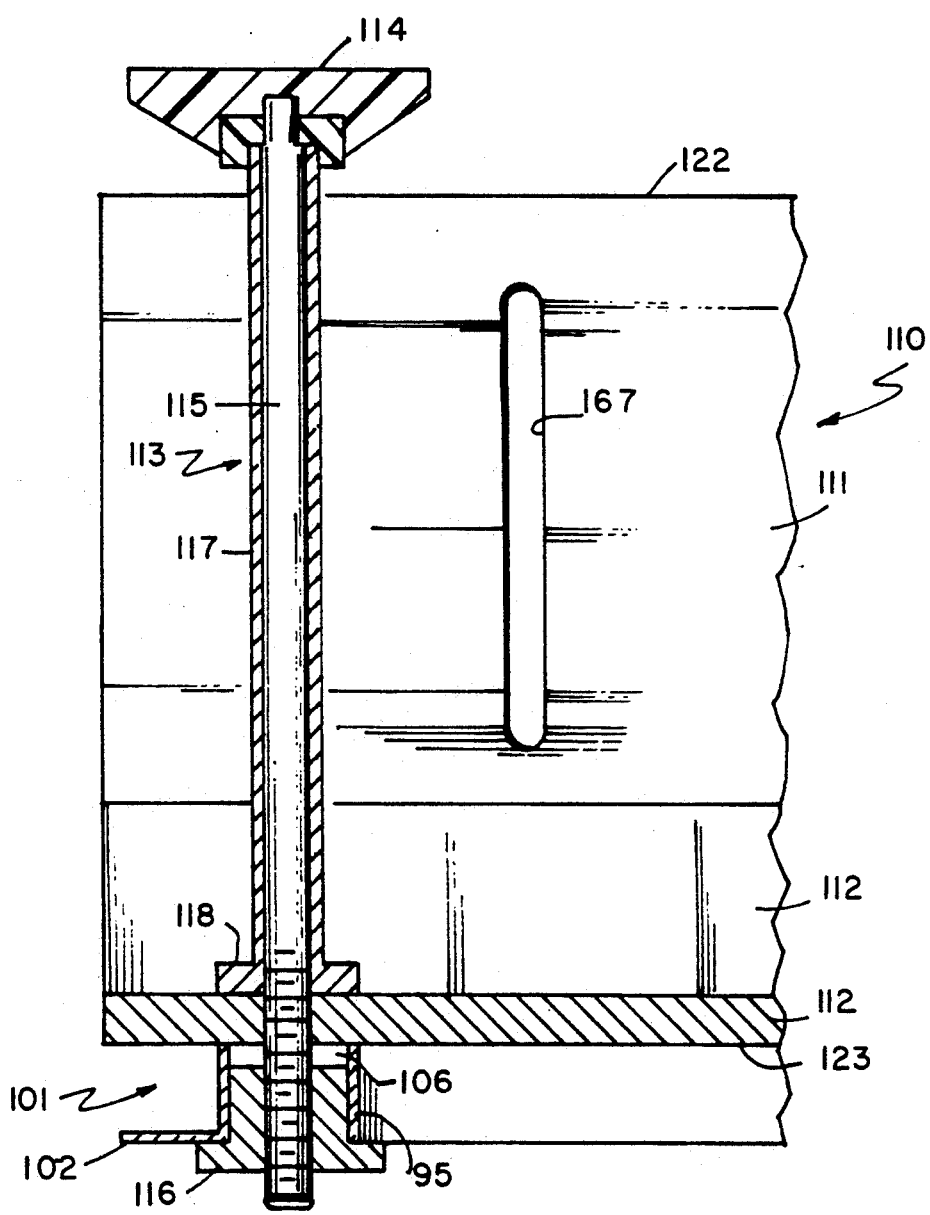
Figure 6B:
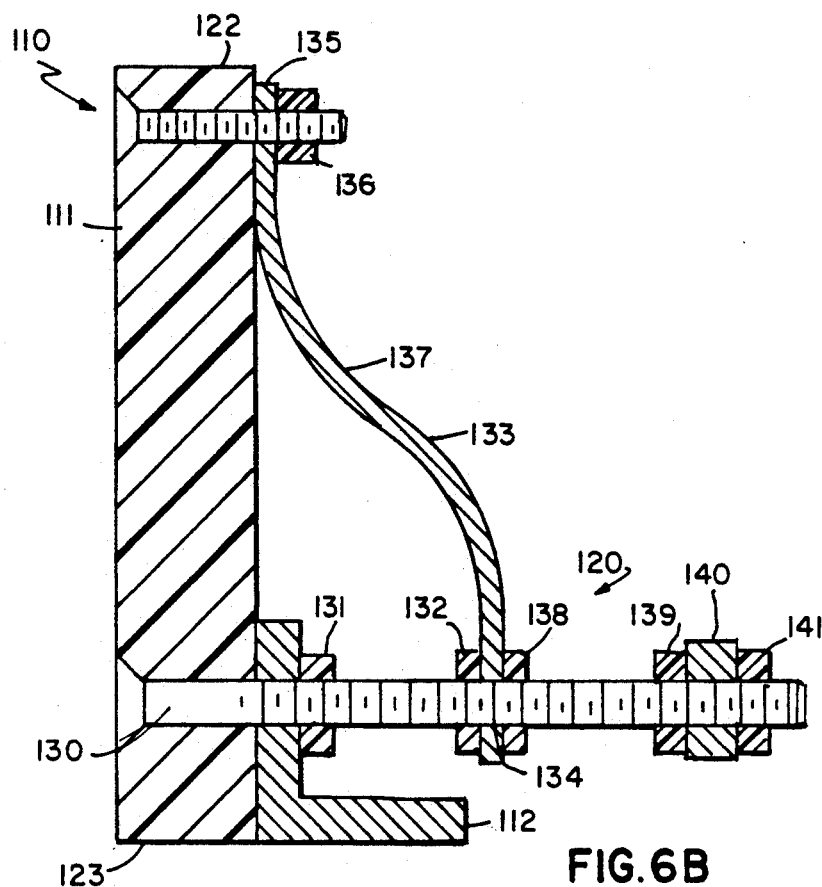

Each of the vertical alignment structures at positions 120 and 121 are similar, so FIG. 6B depicts only the vertical alignment structure at position 120. It includes a bolt 130 that passes through the fence 111 and the base support 112. A nut 131 clamps the base support 112 and the fence 111 and stabilizes the position of the bolt 130. Another nut 132 threads onto the bolt 130 to be spaced from the nut 131. The nut 132 serves as a positioning mechanism for a vertical support arm 133 that has an aperture in a body portion for sliding over the bolt 130. A top portion 135 of the arm 133 attaches proximate the top edge 122 of the fence 111 by a fastening structure 136 such as a nut and bolt. The arm 133 has an intermediate offsetting portion 137 that displaces the bottom of the arm 133 horizontally away from the fence 111. Another nut 138 threads on the bolt 130 to positively capture the bottom of the arm 133. As the nuts 132 and 138 are turned, they displace the bottom of the arm 137 along the bolt 130 and thereby to enable a vernier adjustment of the top 122 of the fence 110. Thus this structure assures that the fence 110 is plumb, that is, exactly at right angles to the surface of the router table 91 shown in FIG. 6.

Figure 6C:
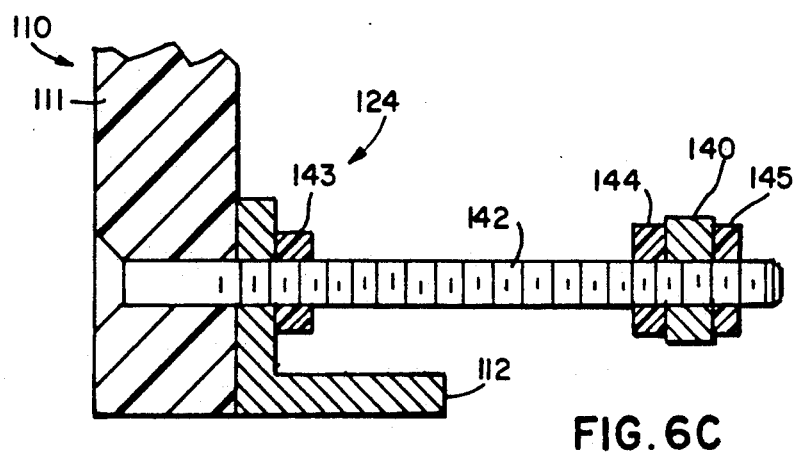
Figure 6D:
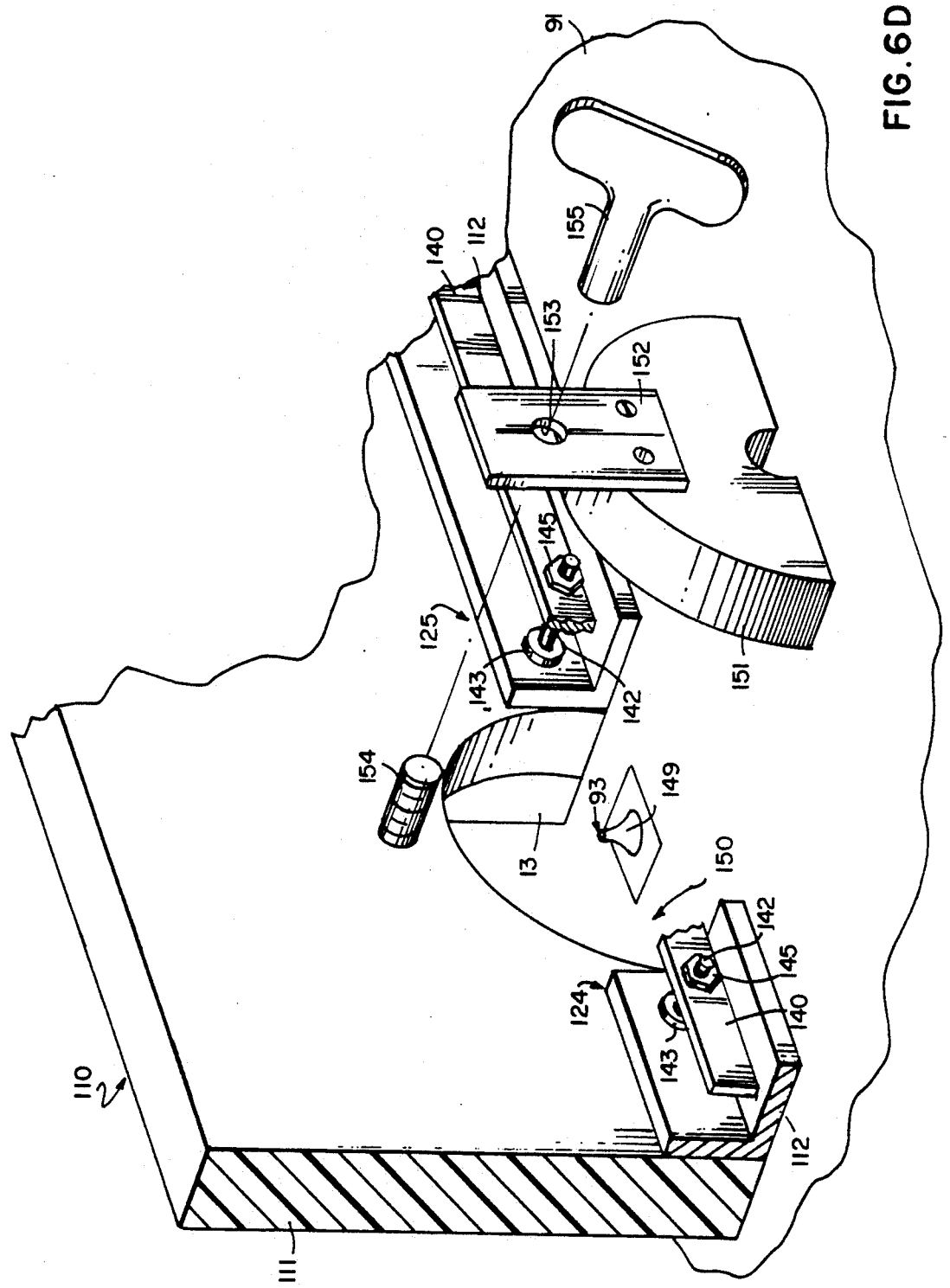

The vertical alignment structures 120 and 121 also can act with other structures that adjust the fence from side to side to maintain the straight plane between the ends 126 and 127 particularly if the angle base support 112 is interrupted as shown in FIG. 6D. This interruption might allow the fence 111 to cup about a vertical axis. More specifically in one particular embodiment this horizontal structure utilizes the bolts 130 associated with each of the vertical alignment structures 120 and 121. Referring first to FIG. 6B, another nut 139 threads onto the bolt 130 near the end thereof to position a horizontal bar 140 that includes an aperture for sliding over each of the bolts 130. Another nut 141 threads on the bolt 130 to position the plate 140 along the bolt 130. The bar 140 extends between the two vertical alignment structures 120 and 121.

The horizontal adjustment structures at positions 124 and 125 complete this adjustment apparatus. Specifically, one or more bolts 142 pass through the fence 111 and the support 112 as shown in FIGS. 6C and 6D. A nut 143 locks this structure together and an extension of the bolt 142. A pair of nuts 144 and 145 thread on opposite sides of the bar 140 that includes an aperture aligned with the bolt 142. The bar 140 therefore extends across each of the bolts 140 and 142 and is rigidly affixed thereto. The nuts 139 and 141 and the nuts 144 and 145 can be adjusted to reposition the ends of the angles 112 adjacent cutter or bit position 93 thereby to maintain a straight plane along the fence 111 between the ends 126 and 127.

The foregoing horizontal stabilizing apparatus enables an aperture 150 to be formed in the fence 111 as shown in FIG. 6D. FIG. 6D specifically depicts a passage 150 through the fence 110 and the support 112 at the cutter or bit position 93 to allow a cutting tool, such as a router bit 149, to be partially in line with the fence 111.

If subsequently the fence 110 is displaced back from the bit position 93, it is possible that a short work piece could cant and drop into the aperture 150. The fence assembly 110 shown in FIG. 6D overcomes this problem by providing an insert 151 having the same configurations as the passage 150 and same thickness as the fence 111. It additionally includes a tab 152 with an aperture 153 for aligning with a bolt 154 extending through the fence 111. Thus, when it is necessary to fill the passage 150 it is merely necessary to slide the insert 151 into the passage 150 allowing the bolt 154 to pass through the aperture 153. A handle 155 with an internal thread can then tighten onto the bolt 150 to clamp the insert 151 in position.

Referring again to FIG. 6, the table 91 defines a first planar work surface and supports a workpiece modifying component in the form of a router bit at bit position 93. The fence assembly 110 constitutes an elongated fence that attaches to the tool and establishes a second or vertical planar work surface that is perpendicular to the first planar work surface. A stabilizing apparatus 160 mounts to the fence 110. It includes an elongated base 161 that attaches to the vertical work surface. It additionally includes an adjustable support 162 that attaches to the base 161 by means of posts 163 and springs 164 thereby to be adjustable with respect to the base member over a range of displacements determined by a displacement limitation structure 165.

As shown particularly in FIGS. 6 and 6A apertures 166 in the base 161 align with vertical slots 167 in the fence 110. A bolt 170 and a clamp handle 171 coact with the base 161 and the fence 110 to provide vertical adjustment. More specifically, The bolt 170 passes through an aperture 166 in the base and a corresponding slot 167 in the fence 110. Consequently simple manipulation of the clamping handle 171 allows vertical positioning and clamping of the stabilizer 160.

A second stabilizer apparatus 180 mounts on the table 91. It includes an L-shaped base 181 and an adjustable support 182. The adjustable support 182 establishes a vertical surface in the form of a face 183 that is perpendicular to the supporting work surface defined by the work table 91. As shown in FIG. 6E, the face 183 may contain a plurality of grooves 184 formed in the surface thereof for minimizing sliding friction exerted when the workpiece 13 slides along the face 183.

Such grooves, or equivalent structures or surface treatments, can be used to reduce sliding friction on any of the surfaces that contact a workpiece. Referring again to FIG. 6D, a plurality of posts 185 and concentric springs 186 attach to the adjustable support 182 and are free to move relative to the base member 181. A displacement limiting structure 187 limits the displacement of the adjustable support 182 from the L-shaped base 181.

Clamping structures 190 and 191 at opposite ends of the stabilizing apparatus 180 pass through a horizontal leg 192 of the L-shaped base 181. These clamps have the same general structure as shown in FIG. 6A including tee-nuts that ride in the channels such as the channel 106.

As will now be apparent, the apparatus shown in FIG. 6A is easy to use. The alignment and positioning of each of the stabilizers 160 and 180 can be by eye. There is not need for precise positioning of either of the stabilizers 160 or 180. The apparatus is tolerant to slight misalignments with respect to a workpiece because the support members maintain a parallel relationship that can cant with respect to the respective base member. When the horizontal stabilizer 180 contacts the edge of the workpiece 13, the two stabilizing structures 160 and 180, the fence 110 and the table 91 form a bounded channel through which the workpiece 13 travels. Consequently the workpiece passes through the tool in a true fashion without side or vertical motion or chatter.

In summary, stabilizing apparatus constructed in accordance with this invention effectively controls the position of a workpiece on a bench tool work surface. Individual stabilizers can engage either the entire length of the workpiece or a substantial portion of that length and provide uniform straight motion of the workpiece. In the specific form of the apparatus shown in FIG. 6, the stabilizing apparatus provides the orthogonal force components F1, F3 and F4 as defined in FIG. 1. Consequently, the operator merely concentrates on providing the force component F2 that moves the workpiece past the cutting tool. The operator does not have to manually control the position of the workpiece.

This invention has been disclosed in terms of specific embodiments. It will be apparent that many modifications can be made to the disclosed apparatus without departing from the invention. For example, specific interconnecting structures including multiple posts and concentric springs, specific clamping mechanisms and fence structures have all been disclosed. Other apparatus could be substituted while attaining some or all of the advantages of this invention. Therefore, it is the intent of the appended claims to cover all such variations and modifications as come within the true spirit and scope of this invention.

What is claimed as new and desired to be secured by Letters Patent of the United States is:

1. Stabilizing apparatus for use with a tool having first and second perpendicular planar work surfaces, said apparatus including stabilizing means for supporting a workpiece for motion relative thereto, said stabilizing means comprising:
   A. elongated base means for attachment to one of the first and second work surfaces,
   B. elongated adjustable support means substantially parallel to said elongated base means for defining a work piece support plane that is displaced from the other of said first and second work surfaces, and
   C. a plurality of spaced interconnection means affixed to said elongated adjustable support means and biased against said elongated base means for enabling said elongated adjustable support means to move relative to said elongated base means and the other of the first and second work surfaces thereby to define a channel between the other of the first and second work surfaces and said elongated adjustable support means for stabilizing the position of the work piece against the other of the first and second work surfaces.

2. Stabilizing apparatus as recited in claim 1 comprising at least one said stabilizing means wherein said elongated adjustable support means collectively define a workpiece support plane that is displaced from and parallel to the other of the first and second work surfaces.

3. Stabilizing apparatus as recited in claim 1 wherein said interconnection means comprises a plurality of spring means extending between said elongated base means and said elongated adjustable support means for biasing said adjustable support means away from said elongated base means.

4. Stabilizing means as recited in claim 3 wherein each said spring means comprises a plurality of posts attached to said elongated adjustable support means and a spring concentrically mounted with each said post intermediate said elongated base means and adjustable support means, said elongated base means having a plurality of apertures therethrough for receiving said posts for motion relative thereto.

5. Stabilizing apparatus as recited in claim 4 further comprising means intermediate said elongated adjustable support means and said elongated base means for limiting the relative displacement of said elongated adjustable support means from said elongated base means.

6. Stabilizing apparatus as recited in claim 1 wherein said elongated base means additionally includes clamping means for attachment of said elongated base means to the one of the first and second work surfaces.

7. Apparatus for use with a tool having a workpiece modifying component positioned at a tool work plane and a first planar work surface for supporting a workpiece for motion relative to the workpiece modifying component, said apparatus comprising:
  A. elongated fence means for attachment to the tool for establishing a second planar work surface perpendicular to said first planar work surface, and
  B. stabilizing means for controlling the relative displacement of a workpiece and the workpiece modifying component including:
    i. elongated base means for attachment to one of said first and second work surfaces,
    ii. elongated adjustable support means displaced from and substantially parallel to said elongated base means for defining a second work piece support plane that is displaced from and substantially parallel to the tool work plane, and
    iii. interconnection means engaging said elongated base means and said elongated adjustable support means for enabling said elongated adjustable support means to move relative to said elongated base means thereby to define a channel between said elongated adjustable support means and the other of said first and second work surfaces for stabilizing the position of the work piece against the other of the first and second work surfaces.

8. Stabilizing apparatus as recited in claim 7 wherein said fence means includes first means for providing vernier adjustment of the second planar work surface relative to the first planar work surface and second means for providing vernier adjustment of the second planar work surface relative to the tool work plane.

9. Stabilizing apparatus as recited in claim 8 wherein said apparatus comprises at least one stabilizing means and wherein said elongated adjustable support means in said stabilizing means collectively define a workpiece support plane that is displaced from and parallel to the other of the first and second work surfaces.

10. Stabilizing apparatus as recited in claim 9 wherein said interconnection means in each said stabilizing means comprises a plurality of spring means extending between said elongated base means and said elongated adjustable support means for biasing said elongated adjustable support means away from said elongated base means.

11. Stabilizing apparatus as recited in claim 10 wherein said spring means comprises a plurality of posts attached to said elongated adjustable support means and a spring concentrically mounted with each post intermediate said elongated base means and said elongated adjustable support means, said elongated base means having a plurality of apertures therethrough for receiving said posts for motion relative thereto.

12. Stabilizing apparatus as recited in claim 10 wherein each stabilizing means further means intermediate said elongated base means and said elongated adjustable support means for limiting the relative displacement of said adjustable support means from said elongated base means.

13. Stabilizing apparatus as recited in claim 9 wherein said each elongated base means has clamping means for attaching said elongated base means to its supporting work surface.

14. Stabilizing apparatus as recited in claim 13 wherein said fence means has vertical slots for receiving said clamping means of a said elongated base means connected thereto thereby to enable adjustment on said fence means.

15. Stabilizing apparatus as recited in claim 7 wherein comprising first and second stabilizing means, said elongated base means in said first and second stabilizing means including means for attachment to said fence means and the first planar work surface respectively, thereby to define a single workpiece channel bounded on four sides of the workpiece.

16. Stabilizing apparatus as recited in claim 15 wherein said interconnection means in each said stabilizing means comprises a plurality of spring means extending between said elongated base means and said elongated adjustable support means for biasing said elongated adjustable support means away from said elongated base means.

17. Stabilizing apparatus as recited in claim 16 wherein said spring means comprises a plurality of posts attached to said elongated adjustable support means and a spring concentrically mounted with each post intermediate said elongated base means and said elongated adjustable support means, said elongated base means having a plurality of apertures therethrough for receiving said posts for motion relative thereto.

18. Stabilizing apparatus as recited in claim 16 wherein each stabilizing means further means intermediate said elongated base means and said elongated adjustable support means for limiting the relative displacement of said adjustable support means from said elongated base means.

19. Stabilizing apparatus as recited in claim 15 wherein each said attachment means with said elongated base means comprises clamping means for attaching said elongated base means to its supporting work surface.

20. Stabilizing apparatus as recited in claim 19 wherein said fence means has vertical slots for receiving said clamping means of a said elongated base means connected thereto thereby to enable adjustment on said fence means.

21. Stabilizing apparatus as recited in claim 15 wherein said elongated adjustable support means is composed of a high-density plastic that produces minimal sliding friction during relative motion between said elongated adjustable support means and the workpiece.

22. Stabilizing apparatus as recited in claim 7 wherein said fence means comprises first and second fence plates that are disposed on opposite sides of the workpiece modifying component and aligned to define the second planar work surface, wherein said stabilizing apparatus includes first and second stabilizing means for attachment to said first and second fence plates, respectively.

23. Stabilizing apparatus as recited in claim 22 wherein said interconnection means in each said stabilizing means comprises a plurality of spring means extending between said elongated base means and said elongated adjustable support means for biasing said elongated adjustable support means away from said elongated base means.

24. Stabilizing apparatus as recited in claim 23 wherein said spring means comprises a plurality of posts attached to said elongated adjustable support means and a spring concentrically mounted with each post intermediate said elongated base means and said elongated adjustable support means, said elongated base means having a plurality of apertures therethrough for receiving said posts for motion relative thereto.

25. Stabilizing apparatus as recited in claim 23 wherein each stabilizing means further means intermediate said elongated base means and said elongated adjustable support means for limiting the relative displacement of said adjustable support means from said elongated base means.

26. Stabilizing apparatus as recited in claim 22 wherein said each elongated base means has clamping means for attaching said elongated base means to its supporting work surface.

27. Stabilizing apparatus as recited in claim 26 wherein said fence means has vertical slots for receiving said clamping means of a said elongated base means connected thereto thereby to enable adjustment on said fence means.

28. Stabilizing apparatus as recited in claim 22 wherein said elongated adjustable support means is composed of a high-density plastic that produces minimal sliding friction during relative motion between said elongated adjustable support means and the workpiece.

* * * * *